UNITED STATES PATENT OFFICE 2,502,839

PROCESS FOR PREPARING SULFUR TRIOXIDE COMPOUNDS OF 4-ALKYL MORPHOLINES

William Baptist Hardy, Bound Brook, N. J., assignor to American Cyanamid Company, New York, N. Y., a corporation of Maine No Drawing. Application January 18, 1946, Serial No. 642,103

8 Claims. (Cl. 260—247)

This invention relates to the production of sulfur trioxide compounds of 4-methyl and 4-ethylmorpholine by the reaction of the corresponding 4-alkylmorpholine with sulfur trioxide in an anhydrous solvent.

The sulfur trioxide addition products of the alkyl morpholines are valuable in the esterification of various phenols and leuco vat dyestuffs.

Various methods have been proposed in the past for preparing the sulfur trioxide compounds of tertiary amines, but none of them have been found to be particularly suitable and economical for obtaining the sulfur trioxide compounds of 4-methyl and 4-ethylmorpholine in a crystalline form of satisfactory purity and stability for larger scale operations. Any process involving aqueous solutions or water purification is usually unsatisfactory because the 4-methyl and 4-ethylmorpholine sulfur trioxide compounds are not too stable in acid medium in the presence of water at elevated temperatures, which makes it difficult to dry the aqueous material without some decomposition. On the other hand, known processes involving anhydrous solvents are not generally applicable due to the fact that other insoluble compounds may also be formed which precipitate from the reaction mixture and contaminate the final product. Thus, it is known to react tertiary bases with chlorosulfonic acid in an inert solvent, but this process in the case of 4-methyl and 4-ethylmorpholine gives a mixture of the sulfur trioxide compound and the hydrochloride which is difficult to separate completely.

According to the present invention a high yield of the sulfur trioxide compounds of 4-methyl or 4-ethylmorpholine can be obtained by extracting a crude, salted out mixture resulting from the alkylation of morpholine, or a distillate of said mixture with an organic solvent, and reacting the organic solvent extract with sulfur trioxide under anhydrous conditions. Various anhydrous solvents may be used for the extraction, including various chloro hydrocarbons, such as ethylene chloride, acetylene tetrachloride, and the like, provided the solvents are non-reactive with sulfur trioxide. The chlorohydrocarbon may contain fluorine. Thus some aliphatic chlorofluoro hydrocarbons are also useful, such as $CHCl_2CCl_2F$, $CHClFCCl_3$, $CHCl_2CClF_2$, $CHF_2CCl_3$, $CH_2ClCCl_2F$.

It is an advantage of the present invention that excellent yields are obtained by reacting sulfur trioxide with the crude extract, and therefore elaborate purification of the alkyl morpholine (such as fractional distillation) becomes unnecessary.

The use of an extract does not make the reaction conditions more critical. Ordinary temperatures ranging from 15° to 25° may be used at the start of the reaction. Usually it is advantageous to introduce the sulfur trioxide into the solution at a lower temperature and then heat up the reaction mixture after the sulfur trioxide has been added.

The production of the extract containing the 4-methyl or 4-ethylmorpholine is quite simple. The ordinary procedure for alkylating morpholine is followed and then the crude 4-alkyl morpholine is salted out, preferably at elevated temperatures such as 60° to 70°, or, if desired, the alkylation mixtures may first be distilled and the crude aqueous distillate salted out. The solvent is then added to produce an extract. Separation of solvent and aqueous layers takes place readily without formation of emulsion, and the solvent mixture is readily clarified and dried, for example, by azeotropic distillation of a part of the solvent. The salt used in salting out the 4-ethyl or 4-methylmorpholine is likewise not critical. Various common salts, such as sodium chloride, magnesium sulfate or ammonium sulfate may be used.

In the preparation of sulfur trioxide compounds from salted out 4-ethylmorpholine it should be noted that the alkylation by-product, sodium ethyl sulfate, has a salting out effect and under some circumstances will salt out most of the 4-ethylmorpholine into the solvent layer without adding any additional salting material.

The extraction of the salted out mixture may be effected at various temperatures. For example, with many solvents the extraction may take place at room temperature. With some solvents the efficiency is increased somewhat by moderate heating.

The amount of solvent to be used is not critical but should be sufficient to extract substantially all the 4-alkylmorpholine. When ethylene chloride is used to extract salted out 4-ethylmorpholine about two volumes of solvent per volume of ethylmorpholine should be used. The extraction is approximately 98% when sufficient salt has been added so that the water layer is saturated. A slightly lower recovery is obtained when the salting out effect of the sodium ethyl sulfate in the reaction mixture is relied upon without adding additional salt.

It is an advantage that the sulfur trioxide can be obtained from various sources. A very satisfactory procedure involves the heating of the desired amount of oleum to a suitable temperature using a heated column and conducting the pure sulfur trioxide obtained directly into the reaction mixture.

It is important to introduce the sulfur trioxide with a certain amount of care in order to avoid the formation of lumps containing unreacted sulfur trioxide. The procedure is quite simple, the sulfur trioxide being introduced into the reaction mixture at a slow and relatively uniform rate and kept from the sides of the container. Of course adequate stirring is advisable. The proportions of reactants are likewise not critical, but for best results it is desirable to use a slight excess of the alkylmorpholine over stoichiometric proportions. A large excess of either reactant gives less favorable results.

Suitable solvents for this process are liquid aliphatic chlorohydrocarbons boiling below approximately 200° C. which are relatively inert to sulfur trioxide and which have no substantial action on the alkylmorpholine at the temperature employed. Solvents which are most satisfactory have some small solvent action for the 4-alkylmorpholine sulfur trioxide compound. The preferred solvent for the 4-ethylmorpholine sulfur trioxide compound is ethylene chloride, in which the sulfur trioxide compound is only 3% soluble at 5° C. to 10° C. Acetylene tetrachloride, in which the solubility at the same temperature is 5%, is also satisfactory, but the product losses will be greater. Additional solvents are methylene chloride, chloroform, and carbon tetrachloride. Some aliphatic chlorofluoro hydrocarbons are also useful. Since most chlorinated solvents will, under certain conditions, react with the 4-alkylmorpholines to some extent, extraction and distillation with these solvents should be performed as quickly as possible and without long standing.

The amount or solvent will vary, depending on whether some of it is to be used for azeotropic drying of the extract. It is an advantage of the present invention that the sulfur trioxide addition product may be filtered from the solvent and the filtrate purified and reused by washing with a sodium carbonate solution and then with water. While many of the chlorinated solvents which are preferred in the present reaction are not very expensive, it is nevertheless desirable to recover them and the simplicity of the recovery system constitutes an economic advantage of the present invention.

The yield and quality of the sulfur trioxide addition product, particularly its stability and suitability for the aqueous esterification process, will vary somewhat according to the reaction temperature used for its formation. Although the reaction will take place to some extent over a wide temperature range, optimum results are obtained with 4-ethylmorpholine in ethylene chloride solution when the sulfur trioxide is passed into the solution at a lower temperature, preferably at 10° C., and then the product is heated at a moderately elevated temperature, about 50-70° C., for approximately one hour. If the heating is omitted, or if the sulfur trioxide is initially passed in at a higher temperature, the yield will be lower and the quality poorer. Heating the sulfur trioxide addition product originally produced at a lower temperature increases the yield and improves the quality. Fairly slow cooling after the heating period will result in a product which has a larger crystal size and is somewhat more stable. The unpurified product of the present process can be kept for several months in the absence of moisture by storing in sealed containers at room temperature without substantial decomposition taking place.

The invention will be illustrated by the following specific examples which are typical. The parts are by weight.

*Example 1*

174 parts of morpholine in 120 parts of water are ethylated by gradual addition of 308 parts of diethyl sulfate and 80 parts of sodium hydroxide in 320 parts of water at a temperature of 50-70° C. The solution is then stirred for approximately one hour longer at 60° C. Upon completion of the reaction, 35 parts of salt are added and the mixture is heated to 75° C. Then 940 parts of ethylene dichloride are added, the mixture is stirred well and the upper layer of ethylene dichloride is drawn off. Ten parts of potassium carbonate are then added, the solution is clarified and the clarified solution is distilled until essentially all the water is removed. The amount of 4-ethylmorpholine contained in the dry ethylene chloride solution is determined and slightly less than the equivalent amount of sulfur trioxide is passed in at 10-15° C. The solution is then gradually heated to 75° C. and kept at this temperature for one hour. It is then cooled to 5-10° C., filtered and washed with a little dry ethylene chloride. The product is obtained in high yield as a nearly white, crystalline solid melting at 148-150° C.

Substantially equivalent results are obtained if the corresponding amount of dimethyl sulfate is substituted for the diethyl sulfate in the alkylation. The 4-methylmorpholine sulfur trioxide compound obtained is a white crystalline solid, M. P. 190-195° C.

*Example 2*

174 parts of morpholine are ethylated as described in Example 1. The aqueous mixture is then distilled with stirring until 514 parts of distillate are collected. 106.8 parts of salt are then added to the distillate and the mixture warmed to dissolve the salt and produce an upper layer of 4-ethyl-morpholine. 800 parts of ethylene chloride are added and the layers separated after stirring. The wet ethylene chloride solution is then dried by distilling off part of the solvent, and the amount of 4-ethylmorpholine contained in the dry ethylene chloride solution is determined. This dry solution of 4-ethyl-morpholine in ethylene chloride is used for the preparation of the sulfur trioxide addition product as described in Example 1. The 4-ethylmorpholine sulfur trioxide compound is obtained in a pure state in excellent yield.

*Example 3*

205 parts of an alkylation mixture (prepared from 43.5 parts of morpholine as described in Example 1) are treated with 8.5 parts of salt and 250 parts of a mixture consisting of about 15% mixed butyl chlorides and ethylene chloride. The solvent layer is separated off and dried as in Example 1. Slightly less than the theoretical amount of sulfur trioxide is distilled into the mixture at 10-15° C. The solution is then gradually heated to 75° C. and kept at this temperature for one hour. It is then cooled to 5-10° C., filtered and washed with a little of the dry solvent. A stable sulfur trioxide compound is obtained in good yield.

Equally satisfactory results are obtained if acetylene tetrachloride is used as the solvent.

The examples describe processes in which the extraction is effected after salting out the alkyl morpholine. This is the preferred process, but the invention is not limited thereto as it is possible to add the solvent before salting out and thus salt out and extract in the same step.

The 4-alkyl morpholines described above are not claimed herein as new chemical compounds, this forming the subject matter of the copending application of Scalera, Lester and Hardy, Serial No. 642,102, filed January 18, 1946, now Patent 2,454,978.

I claim:

1. A process for preparing the sulfur trioxide addition compound of a 4-alkyl-morpholine containing not more than 2 carbon atoms in the alkyl group thereof, which comprises extracting an aqueous mixture containing water-soluble salts and the 4-alkyl-morpholine with an inert, liquid, water-immiscible organic solvent to dissolve the 4-alkyl-morpholine, separating the aqueous salt layer from the organic solution of the 4-alkyl-morpholine so obtained, drying the separated organic solution of 4-alkyl-morpholine, reacting the 4-alkyl-morpholine with sulfur trioxide in said organic solvent under anhydrous conditions to produce the sulfur trioxide addition product thereof, and recovering said sulfur trioxide addition product from said organic solvent, the said organic solvent being a liquid, lower aliphatic chlorinated hydrocarbon having a boiling point below about 200° C.

2. The process of claim 1 wherein the 4-alkyl-morpholine is 4-ethyl-morpholine.

3. The process of claim 1 wherein the 4-alkyl-morpholine is 4-methyl-morpholine.

4. The process of claim 1 wherein said liquid, water-immiscible organic solvent is ethylene dichloride.

5. The process of claim 1 wherein said liquid, water-immiscible organic solvent is acetylene tetrachloride.

6. The process of claim 1 wherein said liquid, water-immiscible organic solvent is a mixture of butyl chlorides and ethylene chloride.

7. The process of claim 1 wherein the drying of the separated organic solution of 4-alkyl-morpholine in the liquid aliphatic chloro hydrocarbon is effected by azeotropic distillation of a portion of the solvent.

8. The process of claim 1 wherein the reaction of the 4-alkyl-morpholine with the sulfur trioxide in the organic solvent is effected by adding the sulfur trioxide to the said organic solution of the 4-alkyl-morpholine at a temperature below room temperature and in amount sufficient to react therewith and the reaction mixture is maintained at a temperature between 50 and 70° C. until the reaction is substantially complete.

WILLIAM BAPTIST HARDY.

REFERENCES CITED

The following references are of record in the file of this patent:

UNITED STATES PATENTS

| Number | Name | Date |
|---|---|---|
| 1,835,841 | Beckett et al. | Dec. 8, 1931 |
| 1,965,828 | Fox | July 10, 1934 |
| 2,402,647 | Lecher et al. | June 25, 1946 |

OTHER REFERENCES

Berichte, vol. 16 (1883), page 1267.
Baumgarten: Berichte, 59, 1168–1169 (1926).
J. A. C. S., July 1944, pages 1087–1091.